United States Patent [19]

Forman et al.

[11] Patent Number: 4,771,667
[45] Date of Patent: Sep. 20, 1988

[54] PRECISION METAL CUTTING SAW AND ASSEMBLY

[75] Inventors: Kenneth E. Forman, Moraga; James Schlachter, Suisun City, both of Calif.

[73] Assignee: Metl-Saw System Inc, Benicia, Calif.

[21] Appl. No.: 903,050

[22] Filed: Sep. 2, 1986

[51] Int. Cl.$^4$ .................. B23D 45/02; B23D 47/02; B26D 7/18
[52] U.S. Cl. ........................ 83/100; 83/147; 83/477.2; 83/489; 83/494
[58] Field of Search ............ 83/471.2, 485, 488, 83/487, 494, 477.2, 100, 147, 486, 486.1, 489

[56] References Cited

U.S. PATENT DOCUMENTS

| | | | |
|---|---|---|---|
| 2,672,170 | 3/1954 | Johnson | 83/494 |
| 3,315,554 | 4/1967 | Jeagers | 83/471.2 |
| 3,695,135 | 10/1972 | Jagers | 83/485 |
| 4,018,118 | 4/1977 | Goff | 83/471.2 |

FOREIGN PATENT DOCUMENTS

| | | | |
|---|---|---|---|
| 2352486 | 4/1975 | Fed. Rep. of Germany | 83/477.2 |
| 725708 | 5/1932 | France | 83/494 |

*Primary Examiner*—Frank T. Yost
*Assistant Examiner*—Hien H. Phan
*Attorney, Agent, or Firm*—Seidel, Gonda, Goldhammer & Abbott

[57] ABSTRACT

A precision power saw assembly which includes a saw table manufactured for exceeding close tolerance cutting of metals by a circular saw blade. The saw blade and its arbor are mounted for horizontal translation from one end of the saw table to the other by means of a servo controlled drive motor which is attached to a ball screw type drive so as to prevent backlash. The arbor is supported on a carriage way positioned vertically below the arbor and is stabilized by a second horizontally positioned carriage way. Each carriage way is attached to a single side of the support frame below the work piece support surface. The saw blade is driven by a constant speed motor having a variable speed transmission and gear box so as to permit selective adjustment of the cutting speed of the saw blade. The work piece is clamped on opposite sides of the cut and a precision work piece positioning apparatus is provided so as to further effectuate the cutting operation within a close tolerance range.

9 Claims, 3 Drawing Sheets

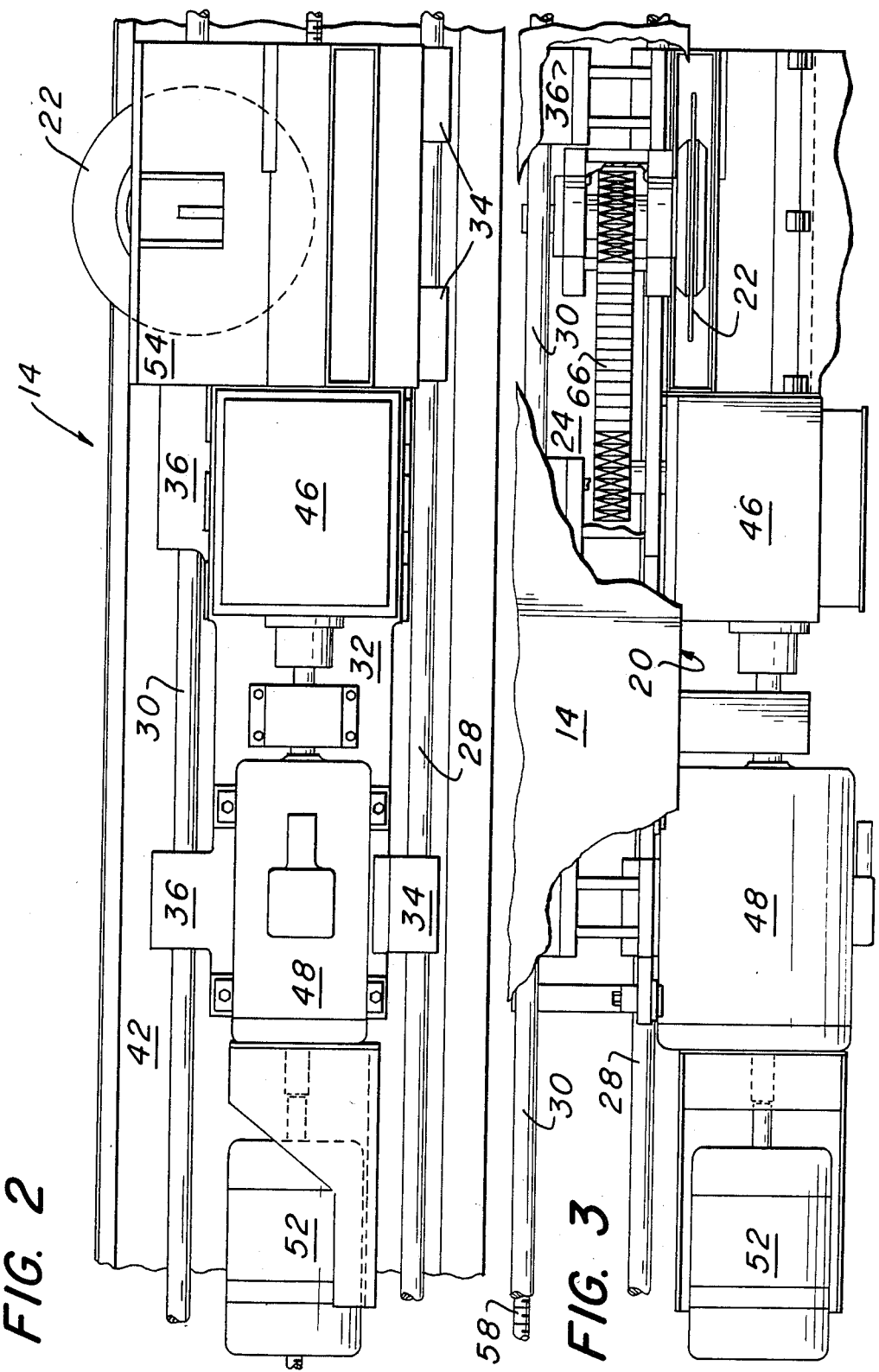

PRECISION METAL CUTTING SAW AND ASSEMBLY

BRIEF SUMMARY OF THE INVENTION

This invention relates to power saws of the type having a rigid table for supporting a workpiece to be cut by a high velocity rotating saw blade that travels from one end of the table to the other as it passes through work piece. This invention also relates to a power saw construction which may cut both aluminum and other non-ferrous metals as well as ferrous type alloys with the use of a single saw arbor and carriage assembly. The preferred power saw of the present invention substantially eliminates all factors that would be lead to inaccuracies in the cutting of a work piece as well as substantially reduces the size of the support frame required for achieving this type cut.

BACKGROUND OF THE INVENTION

A high speed precision metal cutting saw assembly is shown in U.S. Pat. No. 4,018,118, which is herein incorporated by reference, and includes a saw table and support frame manufactured to exceedingly close tolerances and on which a circular saw blade and its driving apparatus is suspended. The saw blade drive or arbor is mounted for horizontal translation together with its driving motor from one end of the table to the other within the interior of the saw table support frame. A stop plate which is adjustable to close tolerances is mounted on top of the saw table and provides an abutment for one edge of a work piece for precision positioning and cutting of the work piece by the saw blade. Additionally, a multiplicity of fluid operated clamps are provided to clamp a work piece in its proper cutting position and retain the work piece on both sides of the cut during the entire cutting operation.

The horizontal translation of the saw blade in the '118 patent includes two carriage ways which are positioned parallel and horizontally adjacent to one another. The saw blade arbor and carrier assembly are supported on and suspended between the carriage ways and move through the interior of the saw table framework. The translation of the carriage and arbor is provided by means of a pinion which engages a fixed rack adjacent to the carriage ways. Each carriage way is fixedly attached to opposite sides of the saw table frame structure. The work piece support surface includes two portions which are, also, mounted on opposite sides of the saw table frame and define a slot for the saw blade. Due to the size of the arbor and carriage assembly, the carriage ways are required to be separated by a substantial distance. The two portions of the workpiece support surface are cantilevered from their respective sides of the support frame and are extended from the frame by a relatively large distance so as to enclose the carriage and arbor assembly and support the workpiece. This structure effectively increases the size of the frame required to support the assembly and work piece and maintain them in position at the desired tolerances of the cutting operation and also limits the amount of clamping pressure which may be applied by the fluid operated clamps on both sides of the cut.

Another known metal cutting saw assembly similar to that shown in the '118 patent utilized two arbor and carriage structures so as to permit the assembly to cut both nonferrous metals, which typically require a relatively high blade cutting speed at a low torque, and ferrous type alloys, which typically require a lower cutting speed than that for cutting non-ferrous metals and have a high torque requirement for precision cutting. The carriage way arrangement utilized for this type structure utilized the two horizontal carriage ways similar to that shown in the '118 patent.

It was previously contemplated to provide two, substantially vertically positioned carriage ways in a dual material cutting saw, having two arbor and carriage assemblies. This arrangement, however, was believed to be unsatisfactory for proper support and stabilization at the desired precision tolerance range.

It was known to utilize one machine for cutting ferrous alloys and another for cutting non-ferrous metals such as aluminum and the like. Typically, the structures of these machines varied, such as the relative size of the table saw frame, the power requirements and saw blade motor speed, depending on the size of the work piece and type material being cut. Additionally, it was known to combine the two structures, as discussed above, so as to utilize two arbors and carriages having separate motors which were positioned on two carriage ways mounted on opposite sides of the frame work so as to cut metals of either the ferrous or non-ferrous type. These machines were built utilizing the more rigid frame as required for cutting the ferrous materials. The two arbors were switched manually so as to achieve the desired cutting operation.

SUMMARY OF THE INVENTION

This invention relates to a high speed precision metal cutting power saw assembly which typically includes a saw table having a substantially horizontal upper support surface including two sides and forming a defined saw slot therethrough for passage of a saw blade through a work piece supported on the upper surface. The assembly also includes a support frame including essentially two sides which are joined together. The two sides of the frame define a base and maintains the work piece support surface in a precise tolerance relationship during the cut of the saw blade. A carriage way assembly area is provided within the interior of the base. The base frame defines a channel through which an arbor and carriage may move freely on two elongated carriage ways to effectuate the transverse cutting operation of the saw blade.

The carriage way assembly of the present invention contemplates two elongated carriage ways extending longitudinally through the channel defined by the table frame and are positioned substantially parallel to the saw slot. The carriage ways support the saw blade arbor during its translational movement with one carriage way positioned substantially vertically below the arbor and the second carriage way positioned horizontally adjacent to the arbor. Both carriage ways are, preferably, attached to one side of the support frame of saw table base so as to effectively maintain the alignment between the movement of the saw blade on the carriage ways and the work piece support surface during the cutting operation. A circular saw blade is rotatably mounted on the arbor assembly and arranged to extend through the saw slot substantially perpendicular to the work piece support surface and maintained in that relationship throughout the cut of the work piece within a close tolerance range ($\pm 0.002$ inches).

A constant speed motor is mounted on a carriage which is supported on the carriage way assembly adjacent the saw blade arbor and is operatively coupled to effectuate rotation of the saw blade when energized. A variable speed transmission and right angle gear box may also be provided between the motor and the saw blade arbor for selective control of the range of cutting speeds of the rotating saw blade. The selective control of the output of the motor permits the saw to be adaptable to cut both ferrous as well as non-ferrous metals while utilizing a single arbor.

Additional structure contemplated relates to chip collection and carriage drive. Typically, chip collection for non-ferrous alloys which are of a relatively lighter weight, is accomplished by means of a vacuum. However, the heavier ferrous alloy chips require removal for disposal by a conveyor or other mechanical type system. The integral chip collection means contemplated permits for adjustment of the chip removal passage way for either type operation. The translational movement of the arbor and carriage assembly with respect to the cut of the work piece is contemplated to be produced by a ball screw drive with a servo controlled motor so as to eliminate the effects of backlash and imprecise chip removal during the cutting operation.

The dual cutting operations of the precision metal cutting saw assembly of the present invention is effectuated without the use of separate arbors or carriages or the use of separate machines. Additionally, the arbor assembly and its drive assembly are positioned in a more effective manner for support of the assemblies as well as for construction of the frame and base structure to effectuate both type cutting operations.

Other advantages of the invention will become apparent to those skilled in the art particularly pointing out a preferred embodiment thereof. For the purpose of illustrating the invention, there is shown in the drawings a form which is presently preferred; it being understood, however, that this invention is not limited to the precise arrangements and instrumentalities shown.

BRIEF DESCRIPTION OF THE DRAWINGS

FIG. 2 shows a side cross sectional view of the carriage way and arbor assembly.

FIG. 3 shows a top view of the carriage way and arbor assembly.

DETAILED DESCRIPTION OF THE DRAWINGS

Figure 1:
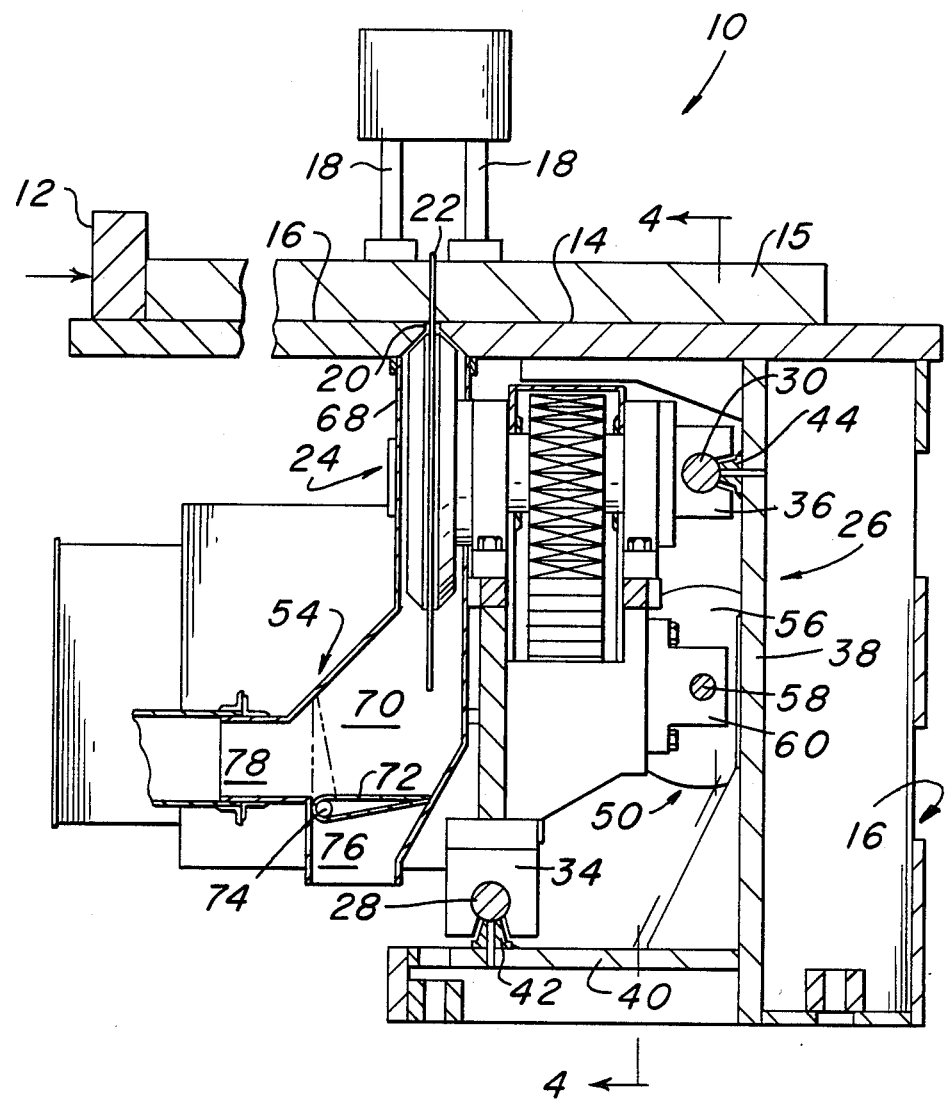
FIG. 1 shows a cross sectional view of the saw assembly illustrating a carriage way and arbor assembly therein.

In the Figures where like numerals indicate like elements there is shown in FIG. 1 an embodiment of a high speed precision metal cutting saw assembly which is generally referred to by the numeral 10. The saw assembly 10 generally includes a work piece positioning assembly 12, an upper support surface 14, a table support frame or base 16 and a work piece clamping mechanism 18. The support frame 16 is typically formed from two substantially identical sub-assemblies and are adapted to support the work piece support surface 14 in a fixed position so that a work piece 15 may be cut in a, preferably, close tolerance range with the cut not being affected by vibration or structural variations. The work piece support surface 14 generally forms two halves having a slot 20 therebetween for passage of a saw blade 22 to effectuate the cut of the work piece 15. The opposite sides of the frame 16 and work piece support surface 14 are provided with pairs of precision ground surfaces adapted to mate with complimentary precision ground surfaces formed on the underside of the support surface 16 so that the two halves interengage with a precision that leaves no space for relative movement between the support surface 14 and the frame work 16. It is important to note that the surface 14 of the assembly 10 on which the work piece 15 is supported is also precision ground so that it is substantially parallel with the bottom ground surface of the support frame 16. The assembly of the support frame 16 may be made in conformance with the teachings of U.S. Pat. No. 4,018,118 as referred to above. The work piece clamping mechanism 18, as shown, includes a plurality of fluid actuated clamping arms which brace the work piece 15 on opposite sides of the saw slot 20 and, thus, on opposite sides of the cut so as to clamp the work piece 15 on work piece support surface 14. This clamping mechanism 18 may also be made in conformance with the teaching of the '118 patent or as desired.

In FIG. 1 there is shown a cross section of the assembly 10 which illustrates a means for effecting a transverse movement of the saw blade 22 along the saw slot 20. A carriage 24 is supported on a carriage way assembly 26 within the center of the frame 16 and below the support surface 14. The carriage way assembly 26 generally includes a relatively lower or vertically positioned carriage way 28 and an upper or horizontally positioned carriage way 30. The carriage 24 including saw blade arbor 32 is supported on the carriage ways 28, 30 by a plurality of linear ball bushings 34 and 36. The carriage ways 28, 30 are generally case hardened shafts which are machined to high tolerance and polished to receive the linear ball bushings 34, 36 in close relationship so that the arbor 32 and carriage 24 may roll longitudinally through the center of the saw assembly 10 with great accuracy and very little effort.

Both portions of the carriage way assembly 26 are mounted on one side of the support frame 16 which, as previously indicated, generally comprises two mating sections. The frame 16 as illustrated in FIG. 1, generally comprises a vertically positioned reinforcement arm 38 and a horizontal reinforcement arm 40. Arms 38 and 40 are attached to one another in a precise manner so as to be substantially perpendicular and define with the support surface 14 passage or channel through the center of the frame 16. Lower carriage way 28 is positioned on horizontal reinforcement arm 40 and upper carriage way 28 is positioned on the vertical reinforcement arm 38. The carriage ways 28, 30 are attached to their respective reinforcement arms 38, 40 by means of brackets 42 and 44. The relationship between carriage way assembly 26, frame 16 and the work piece support surface 14 is desirably maintained constant over the entire length of the carriage way 26 so as to effectuate a precise cut.

It is contemplated by the present invention, as shown in FIG. 1, that the carriage way assembly 26 generally include a lower carriage way 28 which is positioned vertically below the arbor 24 and a second or upper carriage way 30 provided horizontally with respect to the arbor 24. The vertically positioned carriage way supports the weight of the arbor 32 and carriage 24 and maintains them in their precise relationship when being subject to the high torque and forces of the cutting operation. The horizontally positioned carriage way 30 generally stabilizes the arbor 32 and carriage 24 during this cutting operation. By attaching the carriage way assembly 26 to a single portion of the dual sided frame 16 of the saw assembly 10 a more precise relationship between the two carriage ways 28 and 30 can be defined and maintained. The alignment of the carriage ways 28, 30 will not be substantially affected by the shifting of the relative parts of the frame work 16 during extended operation and will be more easily aligned during construction of the saw assembly 10. The relationship between the two carriage ways 28 and 30 is generally provided so that the saw blade is positioned vertical with respect to the work piece support surface 14 and will cut both straight and perpendicular to this support surface 14 at the high tolerance requirements contemplated. Additionally, the contemplated arrangement of the carriage way assembly 26 permits the overall size of the channel through the frame 16 to be reduced, over that shown in the '18 patent, which reduces the length of overhang of the two sides of the work piece support surface 14 on opposite sides of the saw slot 20 as well as the overall size of the frame work 16 which is required to maintain the work piece 15 and support surface 14 in its desired stationary relationship during the cutting operation. The amount of clamping pressure, applied by the clamping mechanism 18 on the work piece 15 on opposite sides of the cut, is also permitted to be increased over that permitted during use of the known devices since the cantilevered support surface 14 will not significantly deflect due to the additional clamping force.

Figure 4:
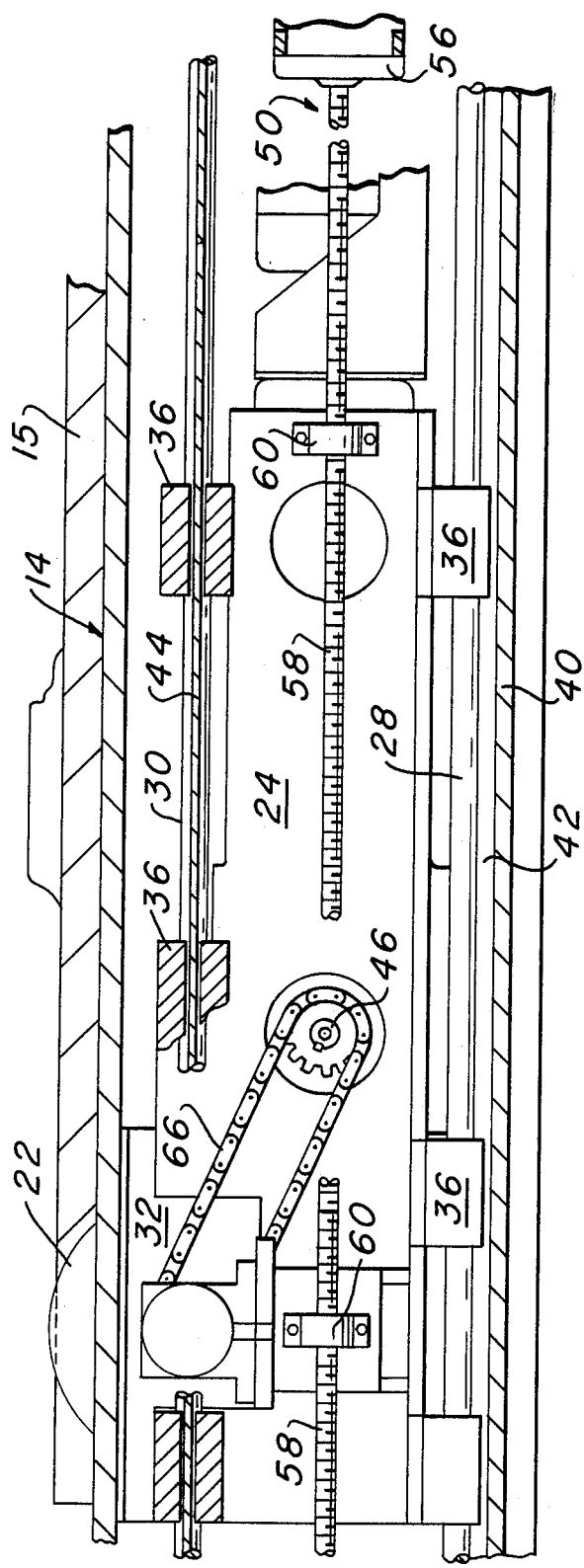
FIG. 4 shows an side cross sectional view of the carriage way and arbor assembly opposite that shown in FIG. 2.

As more particularly shown in FIGS. 2, 3 and 4 the carriage way assembly 26 provides foundation for the slideable mounting of the carriage 24 including the saw blade arbor 32, as well as a gear box 46, a motor 52, a variable speed transmission 48, a lubricating system (not shown) and a chip collection assembly 54.

The movement carriage 24 through the carriage way assembly 26 is created by means of drive assembly 50 including an variable speed motor 56 and preferably a precision servo motor controller. The motor 56 drives a no backlash ball screw 58, which is engaged by brackets 60 attached to carriage 24, to provide a precise carriage 24 and to create a constant chip feed throughout the cut by the saw blade 22. The carriage 24, preferably, travels at a speed which is variable from 0 to at least 200 inches per minute.

The rotational speed requirements of saw blade 22 typcially change with respect to the type of material to be cut. In cutting steel and other ferrous alloy type materials the saw blade speed is preferably between 30-150 rpms. The cutting of nonferrous materials is typically performed at a lower torque than the cutting of ferrous materials and is performed at a speed ranging from 500-2000 rpms. In known machines two arbor assemblies were provided, one being utilized for each of the different cutting operations. In the present invention a single arbor 32 and carriage 24 are contemplated including a constant speed alternating current type motor 52. The motor 52 is connected to the arbor 32 through a clutch assembly and a variable speed transmission 48 which may be adjusted to a effect the range of output requirements for the different type metal cutting operations. A right angle gear box 46 is also provided and includes a two speed selection switch with the slower setting being utilized for cutting ferrous type materials and the relatively higher being utilized to cut the nonferrous materials. This use of a single arbor assembly 32 along with gear box 46 also acts to reduce the overall size and weight of the saw assembly 10. Additionally, by permitting both operations to be performed by a single saw structure 10, separate machines are not required in order to cut varying size stock and materials. Both the cutting speed of the saw blade 22 and the feed rate of the arbor 32, provided by drive assembly 50 are preferably adjusted from control panel (not shown).

Arbor 32 is preferably continuously lubricated and cooled by a close circuit lube oil system including a circulating pump and air cooled heat exchanger (not shown) which are commonly found in the art. The carriage 24 of the present invention preferably may cut either type material in either transverse direction along the slot. The relative change from one carriage direction to another is preferably operated by a control on the control panel (not shown). The carriage 24 may be automatically reversed and returned to its beginning position after the completion of the cut at a rate or speed approximately 200 linear inches per minute or at the same speed at which the cut was made. The rotational motion of the saw blade 22 created by the arbor motor 48 through gear box 46 is made by means of a chain drive 66 on arbor 32.

The saw assembly 10 also includes an adaptable chip collection means 54 for the cutting of either ferrous or non-ferrous materials. The collection system 54 generally includes a housing which surrounds the lower end of the saw blade 22 from a position adjacent to the underside of work piece support surface 14. The housing 68 generally forms an open area 70 below the lower end of the rotating saw blade 22. Within the open area 70 is provided a deflection arm 72 which may be adjusted about a pivot 74 so as to selectively close off either channel 76 or channel 78 as desired. A multiple jet lubrication manifold (not shown) is mounted below the table top on the carriage 24. The jets are directed at the gullets of the blade 22 to remove chips from the blade 22 immediately after they appear below the table top 14. When cutting ferrous type materials the deflection arm 72 is positioned in a relatively vertical position about pivot 74 so as to close off channel 78 (shown in dotted lines in FIG. 1). The open area 70, when the deflection arm is in this vertical position, is in communication with channel 76 which permits the ferrous material chips to fall to a reservoir located below one end of the saw. A filter-separator (not shown) removes the chips from the coolant and a conveyor (not shown) then deposits the chips in a bin for disposal. The coolant which has been separated is then reusable for continued cycling operations. When cutting non-ferrous type materials the deflection arm 72 is placed in its horizontal position about pivot 74 so that the open area 70 communicates with channel 78 (See FIG. 2). The non-ferrous materials are generally lighter and more easily removed from the open area 70 as compared to the chips produced by cutting a ferrous type material. Channel 78 communicates with a vacuum chip collection system (not shown) which collects chips, dust and mist generated by the sawing process. By providing a variable chip removal system in this manner the longevity and the costs of the operation depending upon the materials being cut can be greatly enhanced in addition to adapting the chip removal to function more precisely with the material being cut.

The work piece clamping mechanism 18 which is shown in FIG. 1 of the present invention generally relates to the type shown in the '118 patent, as referred to above. This clamping mechanism 18 generally includes hydraulic pistons which project from an overhead arm towards the upper surface of the work piece 15 on opposite sides of the cut. Each clamp is typically capable of exerting a uniform pressure on the material being held and will not raise until the blade 22 is in its proper home or safe position.

The feed of the work piece 15 into its proper cutting position is created the back drive 12 which generally moves the work piece 15 with precision through the area occuppied by the clamping mechanism 18 and across the saw blade slot 20 on the support surface 14. Upon indexing to the proper position the back drive 12 will maintain its position and the clamping mechanism 18 clamps the work piece on opposite sides of the saw blade slot 20.

The saw assembly 10 as contemplated by the present invention permits the combination of ferrous and non-ferrous sawing operations in a single high precision machine tool. The assembly 10 of the present invention may be utilized in sawing tool steel, stainless and other ferrous metals as well as all non-ferrous materials with accuracy and providing a smooth finish such that subsequent perimeter milling operations can be eliminated. The cut is performed preferably in a fully automatic production basis with a minimum of operator effort. Additionally, by combining the ferrous and non-ferrous cutting operations by using a single arbor 32 and carriage 24 and positioning the carriage way assembly 26 as described, the overall size and weight of the support frame 16 required to maintain the desired tolerances can be substantially reduced over those previously known.

The present invention may be embodied in other specific forms without departing from the spirit or essential attributes thereof and, accordingly, reference should be made to the appended claims, rather than to the foregoing specification, as indicating the scope of the invention.

We claim:

1. A power saw table assembly of the type utilizing a circular saw blade for defining a precision cut comprising: an arbor adapted to support a circular saw blade, a motor supported on a carriage and adapted to rotate a saw blade on said arbor, the arbor and carriage mounted within a frame and adapted for horizontal translation to effectuate a cut by a work piece supported on the frame, means adapted to position a work piece to be cut, means adapted to clamp a work piece onto said frame on opposite sides of the cut, and first and second elongated carriage ways extending longitudinally of the saw table within the interior of the frame and positioned parallel to one another, said carriage ways adapted to support the arbor and the carriage with the first carriage way positioned substantially vertically below the arbor and carriage to support substantially all of the weight of the arbor and carriage and the second carriage way positioned horizontally adjacent the arbor to stabilize the arbor and carriage on the first carriage way, the two carriage ways maintaining the saw blade in a precise cutting relationship with the work piece during torque and load of the continuous cutting operation.

2. The power saw assembly as claimed in claim 1 wherein the motor comprises a constant speed alternating current type motor mounted on the carriage and adapted to effect rotation of a saw blade through a clutch.

3. The power saw table assembly as claimed in claim 2 wherein said motor is adapted to drive the saw blade through a transmission for selectively varying the rotational speed of the saw blade, said transmission mounted on the carriage and adapted to move with the arbor along said carriage ways.

4. The power saw table assembly as claimed in claim 3 wherein the motor adapted to drive the saw blade is connected to said arbor through a right angle gear box having a two speed selection switch for effectuating a high and low range output of the motor to the arbor.

5. A power saw assembly as claimed in claim 1 further comprising an integral chip collection assembly which may be selectively operated for chip removal by means of either a vacuum system or a mechanical conveyor.

6. A power saw table assembly as claimed in claim 1 wherein the frame comprises two mating portions which support a work piece support surface, the work piece support surface defining a slot adapted to permit translation of a saw blade mounted on the arbor through a work piece, the two carriage ways being mounted on a single side of the frame.

7. A power saw table assembly as claimed in claim 1 further comprising a drive means for translating the arbor and carriage along the two carriage ways, the drive means having a DC motor controlled by a servo type controllor, th drive motor adapted to rotate a threaded ball screw which is engaged by the arbor and carriage so as to effectuate the horizontal translation of the cut.

8. A power saw and table assembly of the type utilizing a rotating circular saw blade to effectuate the precision cut of a work piece, comprising: a support frame generally having two mating portions which support a work piece support surface, the work piece support surface defining a slot for translation of the saw blade therethrough during the cut, the support frame and work piece support surface defining a carriage way assembly area within the interior of the frame, two elongated carriage ways each supported on a single portion of the support frame and extending longitudinally on the table and substantially parallel at all points to the slot defined by the work piece support surface, a saw blade arbor and a carriage supported on the carriage ways for translation through said carriage way assembly area, the first carriage way positioned substantially vertically below said arbor and carriage during translation thereof to support substantially all the weight of the arbor and carriage and the second said carriage way positioned substantially horizontally adjacent said arbor and carriage to stabilize the arbor and carriage on the first carriage way, a constant speed saw blade drive motor, a clutch mechanism, a variable speed transmission means and a right angle gear box, each supported on said carriage and adapted for selective control of the rotational speed of the saw blade mounted on said arbor during the cutting operation, chip collection assembly adapted to remove chips and the like from one of the work piece support surface during the cutting operation, the collection assembly being selectably controllable to remove chips by either a vacuum or a mechanical removal means and adapted to move with said arbor and a carriage during translation thereof, a carriage feed assembly having a variable speed motor and means for precision control of the output of said motor, said feed motor driving a ball screw extending parallel to said carriage ways and being engaged by said carriage and arbor to effectuate horizontal translation thereof substantially without backlash, work piece clamping means adapted to engage a work piece during the cutting operation and opposite sides of the cut, and means to position a work piece on a work piece support surface prior to and during the cutting operation.

9. A power saw and table assembly of the type utilizing a rotating circular saw blade to effectuate the precision cut of a work piece, comprising: a support frame generally having two main portions which support a work piece support surface, the work piece support surface defining a slot for translation of the saw blade therethrough during the cut, the support frame and the work piece support surface defining a carriage way assembly area within the interior of the frame, to elongate a carriage way extending longitudinally of the table within the carriage way assembly area and substantially parallel at all points to the slot defined by the work piece support surface, a saw blade arbor and carriage supported on the carriage ways for translation through said carriage way assembly area, the first carriage way positioned substantially vertically below said arbor and carriage during translation thereof to support substantially all of the weight of the arbor and carriage, and the second carriage way positioned substantially horizontally adjacent to said arbor and carriage to stabilize the arbor and carriage on the first carriage way, the two carriage ways maintaining the saw blade in a precise cutting relationship with the work piece during torque and load of the continuous cutting operation.

* * * * *